(12) United States Patent
Miles

(10) Patent No.: US 9,748,890 B2
(45) Date of Patent: Aug. 29, 2017

(54) HYBRID FLOW SOLAR THERMAL COLLECTOR

(71) Applicant: Mark W Miles, Atlanta, GA (US)

(72) Inventor: Mark W Miles, Atlanta, GA (US)

( * ) Notice: Subject to any disclaimer, the term of this patent is extended or adjusted under 35 U.S.C. 154(b) by 0 days.

(21) Appl. No.: 14/302,297

(22) Filed: Jun. 11, 2014

(65) Prior Publication Data

US 2014/0360557 A1    Dec. 11, 2014

Related U.S. Application Data

(60) Provisional application No. 61/833,894, filed on Jun. 11, 2013.

(51) Int. Cl.
| | |
|---|---|
| F24J 2/48 | (2006.01) |
| F24J 2/00 | (2014.01) |
| H01L 35/32 | (2006.01) |
| H02S 10/00 | (2014.01) |
| F24J 2/28 | (2006.01) |
| F24J 2/50 | (2006.01) |

(52) U.S. Cl.
CPC ............ *H02S 10/00* (2013.01); *F24J 2/28* (2013.01); *F24J 2/48* (2013.01); *F24J 2002/0092* (2013.01); *F24J 2002/508* (2013.01); *Y02E 10/44* (2013.01); *Y02E 10/50* (2013.01)

(58) Field of Classification Search
USPC .............. 136/204, 205, 206, 210, 223, 230
See application file for complete search history.

(56) References Cited

U.S. PATENT DOCUMENTS

| | | | |
|---|---|---|---|
| 4,513,732 A | 4/1985 | Feldman | |
| 4,663,495 A | 5/1987 | Berman et al. | |
| 2004/0055631 A1 | 3/2004 | Szymocha et al. | |
| 2007/0220902 A1* | 9/2007 | Matsuoka | H01L 35/32 62/3.3 |
| 2009/0253227 A1 | 10/2009 | Defries et al. | |
| 2013/0319501 A1* | 12/2013 | Hilliard | 136/246 |
| 2014/0345662 A1* | 11/2014 | Gauss | F01N 1/083 136/205 |

FOREIGN PATENT DOCUMENTS

| | | |
|---|---|---|
| DE | 3923821 A1 | 1/1991 |
| DE | 4210975 A1 | 10/1993 |

* cited by examiner

*Primary Examiner* — Susan D Leong
(74) *Attorney, Agent, or Firm* — HM Law Group LLP; Vani Moodley, Esq.

(57) ABSTRACT

A hybrid solar thermal collector is provided. The hybrid solar collector comprises a photovoltaic element to convert sunlight into electricity; and a solar thermal collector device comprising an absorber element to convert sunlight into heat; wherein the absorber element is immersed in a heat transfer fluid in use.

13 Claims, 3 Drawing Sheets

HYBRID FLOW SOLAR THERMAL COLLECTOR

This application claims the benefit of priority to U.S. Provisional Patent Application No. 61/833,894, the entire specification and drawing of which are incorporated herein by reference.

FIELD

Embodiments of the invention relate to devices and methods to harness solar radiation as an energy source.

BACKGROUND

Solar thermal collectors are devices for converting sunlight into heat. They fall into one or more categories including tracking (wherein the collector physically moves in order to follow the path of the sun thereby to increase efficiency), non-tracking, and concentrating (wherein optics are used to concentrate the rays of the sun to increase performance). One other characteristic of solar thermal collectors is their use of heat retention strategies to reduce heat loss to the environment to increase efficiency.

Hybrid solar thermal collectors incorporate a photovoltaic element in the form of a solar cell to allow for the simultaneous production of heat and electricity.

US Patent Application No. 20110120452 describes a solar thermal collector with an approach to heat retention that relies on the properties of the heat transfer fluid (HTF). In that design sunlight passes through the heat transfer fluid, which is transparent to visible radiation, and is incident on a porous light absorbing plate which is heated as a result. The heat is transferred from the HTF to the plate as it passes through the plate. Additional heat, which would normally be lost via thermal radiation from the plate, is absorbed by the HTF because the HTF is opaque to infrared radiation. This formerly lost heat is therefore retained by the collector and efficiency is improved.

SUMMARY

In one aspect of the invention, a hybrid solar thermal collector is provided. The hybrid solar collector comprises a photovoltaic element to convert sunlight into electricity; and a solar thermal collector device comprising an absorber element to convert sunlight into heat; wherein the absorber element is immersed in a heat transfer fluid in use.

Other aspects of the invention will be apparent from the detailed description below.

DETAILED DESCRIPTION

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not others.

Broadly, embodiments of the present invention disclose a hybrid solar thermal collector comprising a photovoltaic element and an absorber element. Advantageously, during operation the absorber element is immersed in a heat transfer fluid. This minimizes thermal losses from the absorber element and improves efficiency so that complicated light concentrating elements are not required.

Figure 1:
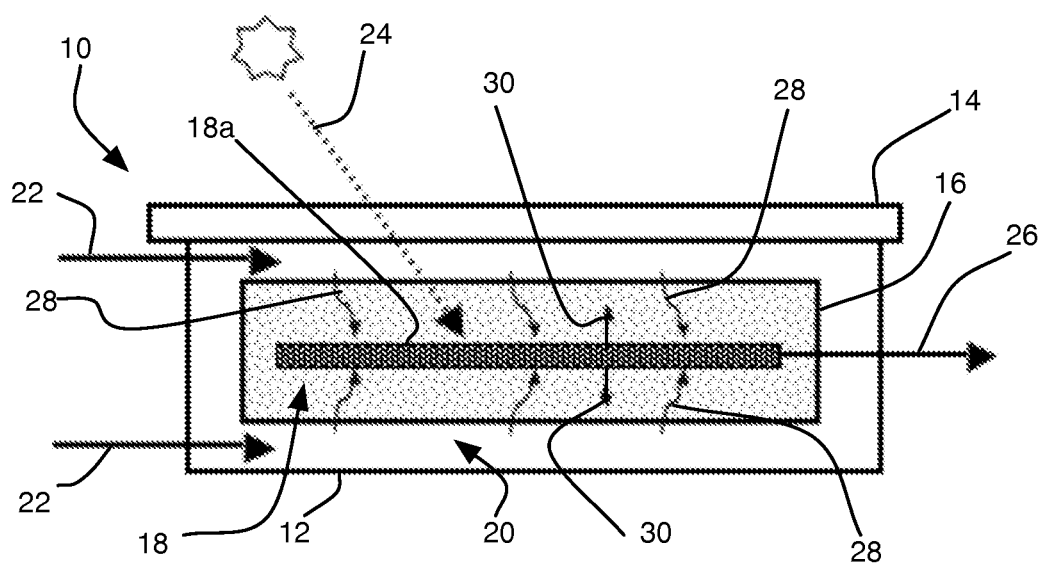
FIGS. 1-3 show cross-sections through a hybrid flow solar thermal collector, in accordance with one embodiment of the invention.

FIG. 1 shows a cross-section through solar thermal collector 10. As will be seen, the collector 10 comprises a hermetically sealed housing 12 that is secured to a transparent faceplate 14 In one embodiment, the transparent faceplate may comprise glass. Suspended within the housing 12 is a nanomaterial medium 16 of a porous transparent material such as aerogel. The material is highly thermally insulating because it has a pore size of between 5 nm and 100 nm and is generally made of a transparent material such as silica with a porosity exceeding 80%. Though other nanoporous materials are possible, silica is advantageous because it is generally transparent to visible light but opaque or highly absorbing to infrared.

Suspended within the medium 16 is a photovoltaic absorber element 18 comprising a planar solar cell made by any one of a number of solar cell manufacturing processes known in the art. Types of cells include but are not limited to cadmium telluride, amorphous silicon, poly-crystalline silicon, and mono-crystalline silicon. A top surface 18a of the absorber element 18 may support a coating to enhance the absorption of light and reduce emission of infrared radiation.

In one embodiment, the process used to make the photovoltaic absorber element 18 may be modified to enhance the electrical conversion efficiency of the element at elevated temperatures (i.e. greater than 25 C). One or more surfaces of the element 18 may comprise structures which enhance the transfer of heat from the element 18 to air or other gasses passing over its surface.

A hollow plenum 20 is located around the nanomaterial medium 16. For the introduction of a heat transfer fluid (HTF) into the device, the housing 12 includes inlets 22. During operation, sunlight 24 is transmitted through the faceplate 14 and the nanomaterial medium 16 and is incident on the absorber element 18 where it is turned into heat. A heat transfer fluid (HTF) is admitted into the hollow plenum 20 where it is pumped through the medium and around the absorber 18 and output from the collector via outlet 26. The absorber element 18 is considered to be immersed within the HTF by virtue of the fact that it is surrounded by and is in physical contact with the HTF, at all points of it's exterior surface. Given that the nanomaterial insulating medium 16 is completely and thoroughly infused with the HTF the absorber element's suspension within the nanomaterial medium 16 further supports the definition of immersion within the HTF. In one embodiment the HTF is nominally a gas, like argon, or a combination of gasses, like air, that is maintained at a pressure between 10 atm and 0.01 atm.

As the HTF propagates through the nanomaterial medium 16 (as indicated by arrows 28) and through and around the absorber 18 it picks up heat from both the nanomaterial medium 16 and the absorber 18 and rises in temperature as a result. The HTF subsequently flows to an external system (not shown) where its heat can be exploited and or converted into other forms of energy. Because the absorber element 18 is heated it loses some energy in the form of infrared (IR) radiation (as indicated by arrows 30) which is subsequently absorbed by the medium 16 and converted into heat which is also transferred to the HTF as it propagates through. This transfer of heat to the HTF from the medium 16 is known as advection. The term advection is used to refer to the countervailing (or opposite) flow of the heat transfer fluid flowing along the path indicated by arrows 28 against heat flowing along the path indicated by arrows 30. As the volume of the advective flow increases the amount of heat lost via flows indicated by arrows 30 decreases. Thus absorption of IR by the medium 16 and transfer of the resulting heat to the HTF via advective flows aids in the retention of heat. Because the absorber element 18 is a photovoltaic device, it converts some portion of the incident light into electricity. As a result the collector produces energy in the form of electricity and heat which may be subsequently used in a number of ways. In general the efficiency of photovoltaic devices goes down as their operational temperature increases. Thus by varying the flow rate of the heat transfer fluid the temperature of the absorber element 18, and therefore its conversion efficiency, can be changed. This allows the ratio of electricity to heat output to be changed as a consequence.

Figure 2:
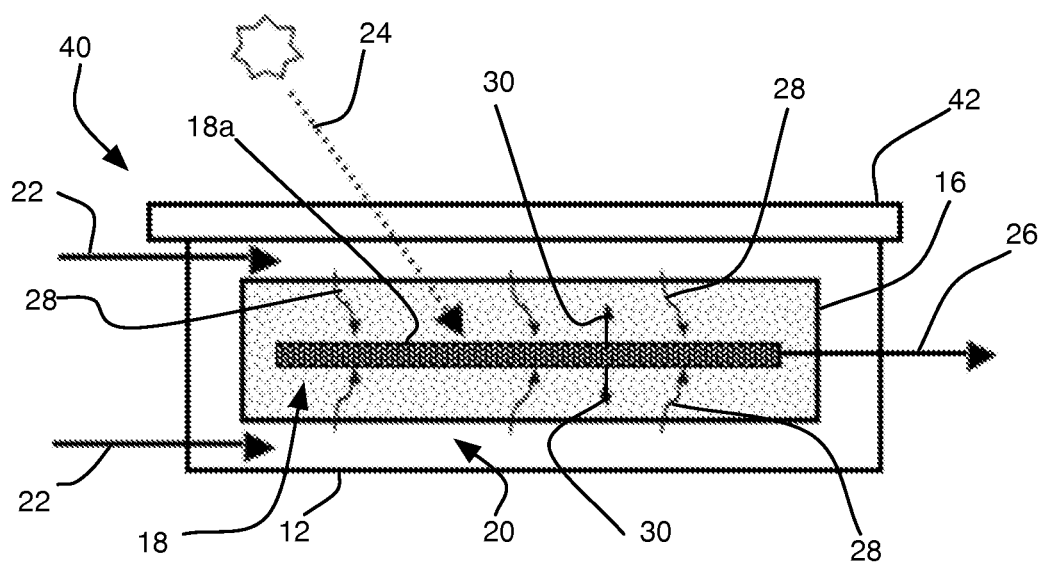

FIG. 2 shows a cross-section of an embodiment 40 of a hybrid solar thermal collector. The embodiment 40 is similar to the embodiment 10. Thus, similar or the same components in both embodiments are indicated using the same reference numerals. In the embodiment 40, the transparent faceplate 14 is replaced by a semitransparent photovoltaic element 42.

The semitransparent photovoltaic element 42 may be manufactured by utilizing a modified fabrication process of a standard solar cell of the kinds described above. For example if the back contact for a cadmium telluride solar cell comprises a transparent conductive oxide such as indium tin oxide, a portion of the incident light is absorbed and converted into electricity, a portion is absorbed and converted into heat, and a portion is transmitted.

In this embodiment, the incident light 24 is partially converted into electricity and a portion of the remaining light is subsequently incident on the porous absorber 18 beneath the element 42. The porous absorber 18 converts the remaining incident light into heat, and raises the temperature of the air passing through it. The embodiment 40 is compromised by the fact that the conversion efficiency of the element 42 is less than that of a standard solar cell. However, because the element 42 does not absorb all of the light, and is not contained with the nanomaterial insulator 16, it does not achieve high temperatures during operation. Thus, its efficiency does not degrade as a consequence.

Figure 3:
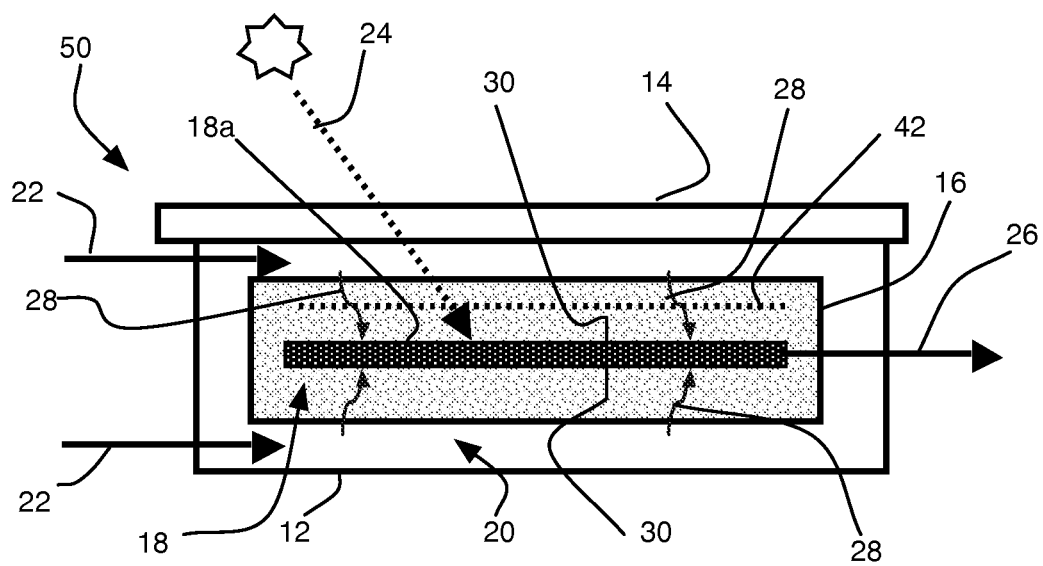

FIG. 3 shows a cross-section of an embodiment 50 of a hybrid solar thermal collector. The embodiment 50 is similar to the embodiment 10. Thus, similar or the same components in both embodiments are indicated using the same reference numerals. In the embodiment 50, the element 42 is interposed between the transparent faceplate 14 and the porous absorber 18. That is to say that the element 42 is now immersed within the HTF and the nanomaterial insulating medium. As with the embodiment 40, a portion of the incident light 24 is converted into electricity. However because the element 42 is located inside the nanomaterial medium 16, the heat it produces by absorbing a portion of the light is retained and transferred to the porous absorber 18 via advection. A greater amount of heat can thus be transferred to the HTF for beneficial use. The fact that the photovoltaic absorbing element 42 or the porous absorber 18 is heated and the nanomaterial medium 16 is insulating means that a temperature gradient is established within the medium 16.

For all of the embodiments, the pore size of the medium 16 is near the mean free path of gasses in the operational pressure regime. As a consequence preferential pumping of the gas can result in an effect known as Knudsen pumping. The result of this is that the HTF will flow spontaneously in the direction as indicated by the arrows 28. If the Knudsen pumping is sufficient then the need for an external pump to transport the HTF may be minimized or eliminated.

Advantageously, with the above-described hybrid solar-thermal collector, the nanomaterial within the housing is opaque or partially to highly absorbing to infrared radiation, thus circumventing the constraint that the HTF be opaque or absorbing in the IR. Since many potential HTFs are not opaque or absorbing in the IR it is advantageous to have a collector design which does not require that property in the fluid.

Another advantage of the above-described solar-thermal collector, is that Knudsen pumping avoids some of all of the energy that is required to pump the heat transfer fluid.

Another advantage of the above-described solar-thermal collector is that is simultaneously produces electricity and high quality heat with high efficiency and low losses.

In collector embodiments both with and without a photovoltaic element, the properties of the nanomaterial medium including pore size, pore size distribution, material composition, thickness, transparency to visible, near, and mid IR, thermal conductivity can all be modified to optimize a combination of Knudsen flow properties, heat retention, advection, and maximum output temperature of the solar thermal collector.

The invention claimed is:
1. A hybrid solar collector, comprising:
a photovoltaic element to convert sunlight into electricity; and
a solar thermal collector device comprising a fixed non-movable absorber element to convert sunlight into heat; wherein the absorber element is fully immersed in a heat transfer fluid, wherein the heat transfer fluid absorbs and retains heat loss.
2. The solar collector of claim 1, wherein the photovoltaic element is separate from the absorber element.
3. The solar collector of claim 2, wherein the photovoltaic element is semi-transparent and is positioned above the absorber element, when the solar collector is in an operating position.
4. The solar collector device of claim 3, wherein the photovoltaic element is coupled to a housing for the solar thermal collector device.
5. The solar collector of claim 1, wherein the photovoltaic element and the absorber element are integrated to form a photovoltaic absorber.
6. The solar collector of claim 5, wherein a top surface of the photovoltaic absorber comprises a coating enhance the absorption of light.
7. The solar collector of claim 6, wherein said coating reduces the emission of infrared radiation.
8. The solar collector of claim 1, wherein the absorber element is located within a nanomaterial medium.
9. The solar collector of claim 6, wherein the nanomaterial medium is porous.

10. The solar collector of claim 9, wherein the nanomaterial medium comprises pores with pore size between 5 nm and 100 nm.

11. The solar collector of claim 9, wherein the nanomaterial medium comprises an aerogel.

12. The solar collector of claim 9, wherein the nanomaterial medium comprises silica.

13. The solar collector of claim 9, wherein the nanomaterial medium functions as a Knudsen pump to displace the heat transfer fluid.

* * * * *